March 23, 1971   J. S. JOHNSTON   3,572,086
VISCOMETERS
Filed March 4, 1969   3 Sheets-Sheet 2
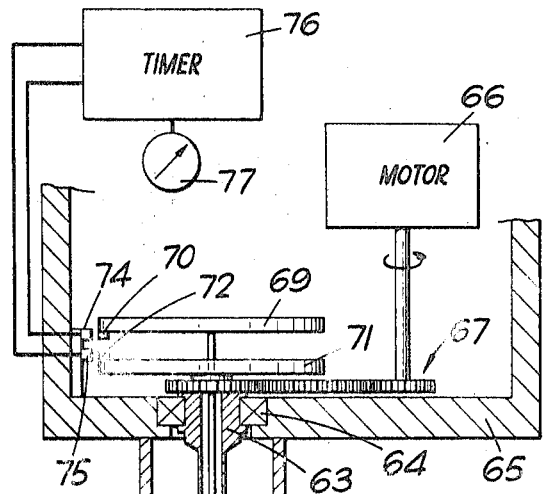
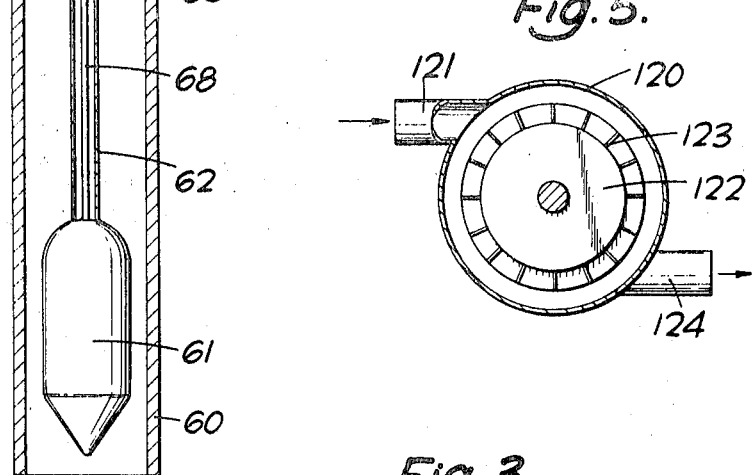
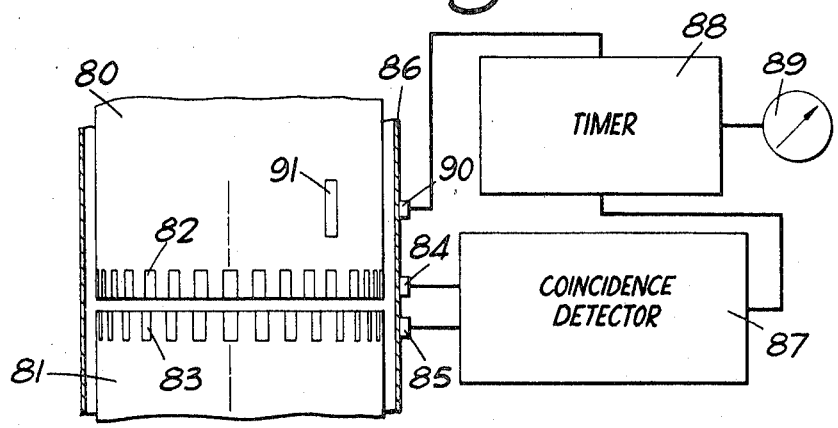

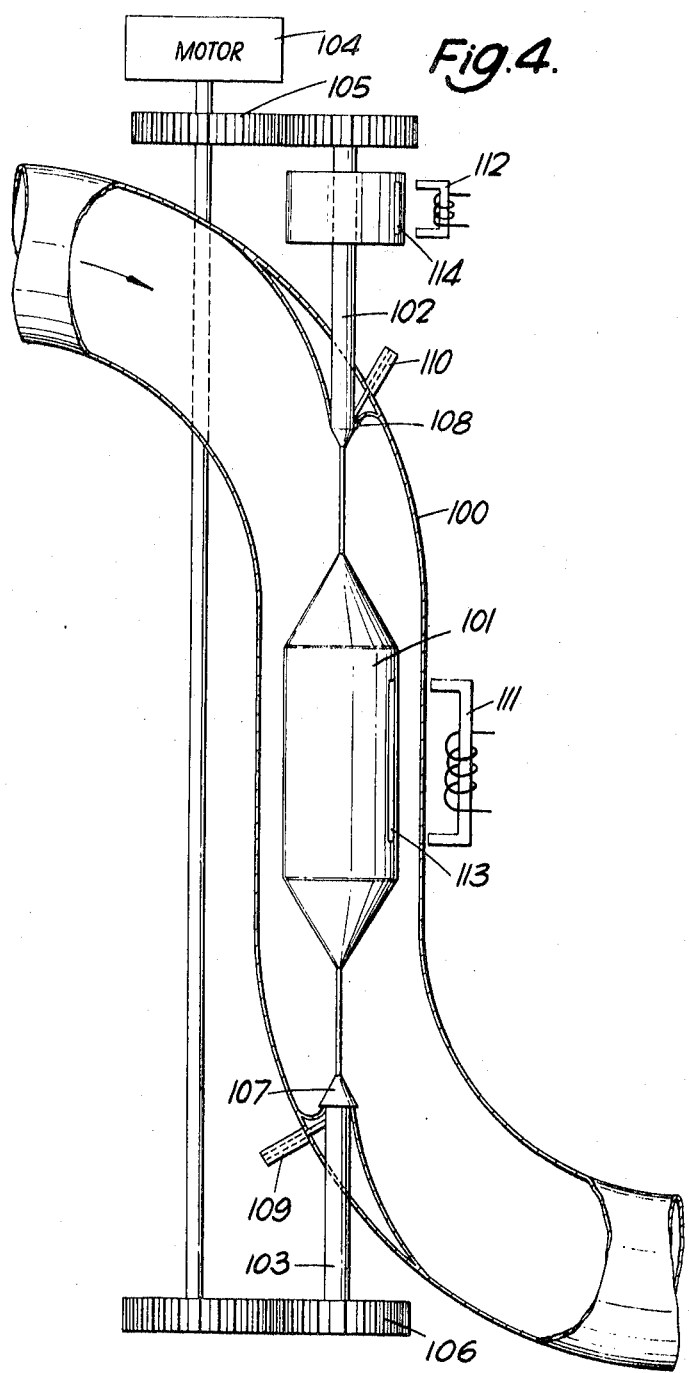

United States Patent Office 3,572,086
Patented Mar. 23, 1971

3,572,086
VISCOMETERS
James Stewart Johnston, Bognor Regis, England, assignor to Rosemount Engineering Company Limited, Bognor Regis, Sussex, England
Filed Mar. 4, 1969, Ser. No. 804,214
Claims priority, application Great Britain, Mar. 7, 1968, 11,143/68
Int. Cl. G01n 11/14
U.S. Cl. 73—59          24 Claims

ABSTRACT OF THE DISCLOSURE

A viscometer has a cylindrical driven member immersed in the liquid within a cylindrical container. A continuously rotated drive shaft extends into the container and is coupled by a resilient coupling to the driven member so that the viscous drag due to fluid in the annular gap between the driven member and container causes the driven member to lag behind the drive shaft; the lag is sensed as a time lag, using sensors outside the container, as a measure of viscosity. With this construction, the viscous torque is not transmitted through any seals or bearings. Guard rings directly driven by the drive shaft may be provided adjacent the ends of the driven member to eliminate end effects. A vernier measurement system with electrical read-out is provided.

BACKGROUND OF THE INVENTION (1) Field of the invention

This invention relates to viscometers that is to say devices for measuring or responsive to the magnitude of the viscosity of a fluid.

(2) Description of the prior art

One known form of viscometer comprises two coaxial cylinders with the fluid under test interposed between them, with means for rotating the outer cylinder at a known angular velocity and means for measuring the torque on the inner cylinder. From the measured torque, with a knowledge of the physical dimensions of the apparatus, the coefficient of viscosity of the fluid under test can be calculated. Direct reading of viscometers are known and, for example U.S. specification No. 2,679,750 describes a viscometer in which a cylindrical rotor is driven at constant speed in a cylindrical vessel containing the fluid under test, the drive to the rotor including a spring and means are provided for indicating the time lag of rotor with respect to its drive due to the viscous drag on the rotor by measuring the time interval between the passage of datum points on the drive and driven members respectively past a fixed point.

In such prior devices however, the torque due to the viscous drag on the rotating member has been transmitted to the measuring means through a shaft supported in bearings with the result that any further resistance to motion due to the bearing increases the apparent viscous drag. This raises serious difficulties if it is required to measure the viscosity of a fluid under pressure or a conversion or very hot fluid because of the problems of sealing a shaft in these conditions.

SUMMARY OF THE INVENTION

It is one of the objects of the present invention to provide an improved form of viscometer avoiding this difficulty.

According to this invention, a viscometer comprises a fixed member, a drive member rotatably mounted in said fixed member, a driven member resiliently coupled to said drive member to be driven thereby, said driven member having a surface uniformly spaced from the internal surface of the fixed member, and means responsive to the lag of the driven member with respect to the drive member. With this construction, there is no transmission of the torque to be measured through a bearing or shaft seal. The fixed member may be a fluid container or pipe line. As will be explained later, the rotatable drive system may be wholly within the container. If, on the other hand, the drive member extends through a shaft seal in the container wall, friction in this shaft seal will not affect the accuracy of measurement.

The means responsive to the lag of the driven member with respect to the drive member preferably comprises timing means to determine the time lag between the passage of datum points on the drive member and driven member past fixed reference points. As will be explained hereinafter, the time lag is a measure of the viscosity which is independent of the speed of rotation provided the speed is constant over the measuring interval. If the viscometer is used for measuring viscosity, an indicator may be provided for indicating the time lag. For control purposes, it may merely be necessary to determine whether the viscosity is above or below a predetermined value or within a predetermined range.

Conveniently the drive member is continuously rotated; if the time lag, as distinct from angular displacement, is measured the rotational speed is immaterial. However the drive member may be oscillated and in this case the oscillation must be such that constant lag is achieved over that part of the oscillation in which the lag responsive means is operative.

Conveniently the fixed member has a cylindrical internal surface and the driven member has a cylindrical external surface. The fluid is in shear between these two surfaces and the dimensions of the members and the width of the gap between the surfaces would be chosen in accordance with the appropriate range of viscosities over which the viscometer is to be operative.

A particular advantage arises in the arrangement having the drive member in a container or extending into a container in that the drive member may have a portion lying closely adjacent one end or both ends of said driven member. The drive member and driven member, in steady state conditions rotate at the same speed and hence, by making portions of the drive member closely adjacent the ends of the driven member, there will be negligible viscous drag on the end surfaces of the driven member.

The driven member may be resiliently coupled at each end to the drive member; in one arrangement this coupling is effected by elongated torsionally resilient coupling means for example torsionally resilient rods. Alternatively the driven member may be coupled to the drive member at one end thereof and the driven member may be a hollow member with rigid coupling means extending from one portion of the drive member through the driven member to a further portion of the drive member beyond the far end of the driven member.

In another arrangement a driven member is coupled to said drive member by a torsionally resilient tube concentric with the axis of rotation and a rigid rod is arranged extending from the driven member through the tube and drive member to the aforesaid means responsive to the lag, which means located outside the container. It will again be noted that there is no need for this rigid rod to pass through a bearing or through any shaft seals or liquid seals.

The fixed member may be a container having an inlet and outlet for the continuous flow of a fluid and, with the arrangement of the present invention, it is possible to have the fluid in the container under pressure. The drive member may extend through the container wall and may be continuously rotated by an electric motor or hydraulic motor or pneumatic motor outside the container. However it is possible with the arrangement of the present invention to avoid having any drive member extending through the container walls. The drive member for example may include a permanent magnet which is rotated by means outside the container producing a rotating magnetic field acting on the magnet. If the container has fluid flowing through it, the drive member may be shaped so as to be rotated by the flow of fluid through the container. In this case conveniently the inlet and outlet are arranged to give tangential flow and the drive member may have blades or paddles.

The aforementioned means responsive to the lag may include sensing means outside the container sensing the passage of a datum point on the driven member past a fixed reference point. The sensing means for example may be electromagnetic or optical or may be electrical capacitive or nuclear radiation techniques to obtain electrical signals in response to the passage of a datum position indicator on the driven member. If the drive member is wholly within the container, similar sensing means may be employed for sensing the passage of a datum point in the drive member. If the lag of the driven member is very small, the sensing means may be vernier sensing means detecting the coincidence of the passage of one of a number of marks or marker elements on the driven member and one of a different number of marks or marker elements on the drive member past a reference point.

BRIEF DESCRIPTION OF THE DRAWINGS

FIG. 2 is a diagrammatic representation of a modification of the viscometer of FIG. 1;

FIG. 3 illustrates another modification of the viscometer of FIG. 1;

FIG. 4 illustrates yet another form of viscometer; and

FIG. 5 is a sectional plan view of part of a viscometer illustrating a fluid drive system.

DESCRIPTION OF THE PREFERRED EMBODIMENTS

Figure 1:
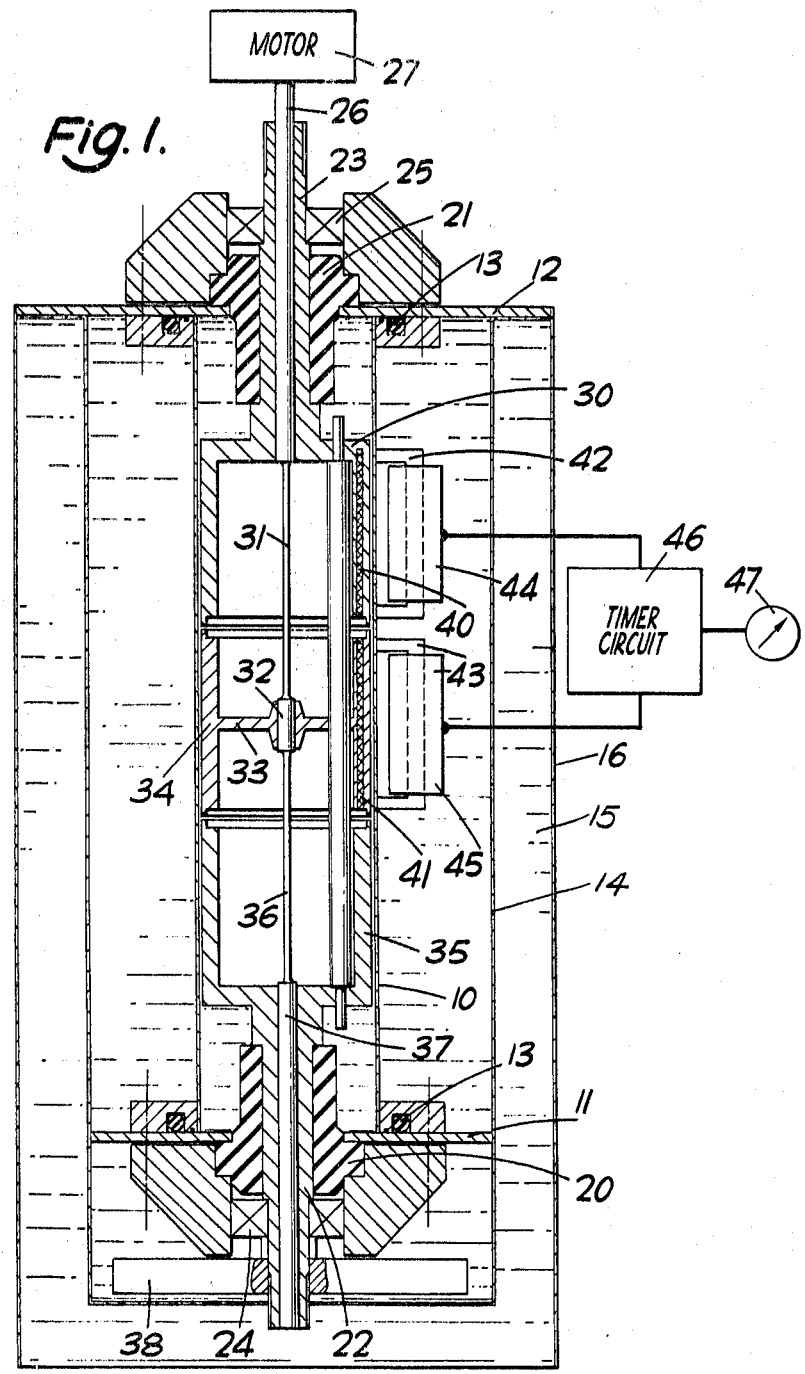
FIG. 1 is a sectional elevation, partly diagrammatic, of a viscometer.

Referring to FIG. 1 the fluid of which the viscosity is to be measured is contained within an inner cylinder 10 closed at its ends by end plates 11, 12 having O-ring seals 13. The lower end plate 11 is carried by a support structure 14 from the upper end plate 12. This support structure 14 lies within an oil bath 15 formed by an outer cylindrical wall 16. The oil in the bath 15 is on both sides of the support 14 and serves to maintain the fluid in the cylinder 10 at a constant temperature. The oil bath is thermostatically controlled at the required temperature by heating means and a thermostat (not shown).

The end plates 11, 12 carry shaft seals 20, 21 respectively through which extend shafts 22, 23 supported in bearings 24, 25. The shaft 23 is a hollow shaft which is secured to an inner shaft 26 driven by a motor indicated diagrammatically at 27. This motor may be an electric or hydraulic or pneumatic motor. The motor 27 has to drive the shaft at a substantially constant speed but the actual speed does not affect the measurement of viscosity. The outer shaft 23 is integral with an inner inverted cup-shaped member 30 having an external cylindrical surface lying closely adjacent the inner surface of the cylinder 10. The inner shaft 26 within the cylinder 10 has a small diameter portion 31 which forms a torsionally resilient coupling between the drive shaft 26 and a boss 32. This boss 32, by means of a spider 33 supports a further cylindrical member 34 having an outer cylindrical surface lying closely adjacent the inner surface of the container 10. In the region between the member 34 and container 10 where the fluid in the container 10 will be subjected to shearing forces giving rise to the viscous drag on the member 34 which is a measure of the viscosity. The spacing between the surfaces of the members 34 and 10 is therefore chosen to be appropriate for the range of viscosity is to be measured. Below the member 34 is a further cup shaped member 35 similar to the member 30 and integral with the aforementioned shaft 32. The boss 32 of the member 34 is also connected by a further small diameter shaft 36 forming a second torsionally resilient coupling to an inner shaft 37 which extends through and is secured to the aforementioned shaft 22. The shaft 22 also carries an impeller, illustrated diagrammatically at 38, to promote circulation of the oil in the oil bath.

Ferromagnetic elements 40, 41 are arranged in the members 30 and 34 respectively. Each of these ferromagnetic elements extends parallel to the axis of the assembly at one point of the periphery of the member and their passage past datum points is detected by means of electromagnetic pick-ups 42, 43 respectively. These pick-ups have coils 44, 45 connected respectively to a timer circuit 46 having an indicator 47.

The operation of the apparatus of FIG. 1 is as follows:

The motor 27 runs at a substantially constant speed and drives the members 30, 35. The driven member 34 lags with respect to these drive members due to the viscous drag putting a retarding torque on the member 34; the angular lag depends on this torque and the torsional resilience of the couplings 31, 36.

The deflection of the resilient coupling is linear with applied torque and hence the angular displacement between the driven member 34 and the drive members 30, 35 is directly proportional to the force exerted on the driven member 34 by the viscous drag of the fluid in the container 10. If the velocity gradient within the bulk of the fluid due to the angular velocity of the driven member 34 is substantially constant (i.e. a so-called Newtonian fluid) then the force exerted on the driven member by the viscous drag of the fluid is proportional to the velocity gradient within the fluid.

The time interval between the passage of datum position indicating means giving the relative position of the drive member 30 with respect to the driven member 34 is proportional to the ratio between their angular displacement and their angular velocity.

Thus if:

$t$ is the time interval between the passage of each datum position indicating means;
$\eta$ is the coefficient of viscosity of the fluid under test;
$D$ is the velocity gradient within the fluid under test;
$d$ is the distance between the driven member 34 and the wall of the container 10;
$V$ is the peripheral velocity of the drive member;
$F$ is the viscous force exerted on the driven member at a peripheral velocity V;
$S$ is the angular displacement of the driven member 34 with respect to the drive member 30, and assuming the displacement of the resilient coupling system is linear with respect to applied force, then:

$$S \alpha F$$

but, $$F \alpha \eta$$

and $$D = V/d$$

(if velocity gradient is such that the velocity of fluid near the stationary wall tends to zero) therefore, $$S \alpha \eta \frac{V}{d}$$

and since $$t \alpha \frac{S}{V}$$

$$t \alpha \frac{\eta V}{dV}$$

that is $$t \alpha \frac{\eta}{d}$$

Hence the time interval depends only on the viscosity of the fluid with a constant determined by the geometry of the viscometer. It is thus possible to calibrate a direct readout to give immediately the viscosity of the fluid. Non-Newtonian behaviour may be immediately detected by changing the angular velocity to see if the indicated viscosity is altered. If this is the case steps must be taken to ensure that the velocity gradient is constant throughout the fluid under test.

The viscometer may be adapted so that the fluid in the viscometer may be slowly and continuously changed. One convenient method is to provide for the addition and removal of fluid through the second member by means of small openings or ports. Thus adapted the viscometer may be placed directly in the flow of the fluid to be tested or may be connected in a by-pass loop.

FIG. 2 illustrates an arrangement which is particularly adapted to being inserted directly into a tank or pipe-line containing fluid of which the viscosity is to be monitored. The construction of FIG. 2 is moreover an arrangement in which the measuring element on which the viscous drag is exerted is remote from the sensing point; this arrangement may be used for example at high temperatures, e.g. in the measurement of the viscosity of molten glass.

In the construction of FIG. 2, an outer cylinder 60 is open at the bottom end and closely surrounds a cylindrical member 61 supported on a hollow torsionally resilient shaft 62 from a drive member 63. This drive member 63 is mounted in a bearing 64 in a fixed support 65 and driven by a motor 66 through gearing 67. A rigid rod 68 extends upwardly from the rotating cylindrical member 61 and carries a disc 69 with a measuring mark 70. Since negligible driving torque is required to rotate the disc 69, it is readily possible to make the rod 68 effectively rigid against twisting. A second disc 71 carried by the driver member 63 has a reference mark 72. In this particular construction, photoelectric sensors 74, 75 are connected to a timer circuit 76 with an indicator 77 which indicates the time interval between the passage of the marks 70 and 72 past the sensors 74, 75.

It will be seen that the apparatus of FIG. 2 can be lowered into, for example, molten glass, so that the member 61 is immersed. The viscosity is then indicated on the indicator 77 in a manner similar to the operation of the viscometer of FIG. 1.

If the viscous drag is small, there may only be a very small angular rotational lag of the driven member with respect to the drive member. The sensing means in this case may utilise a vernier system. This is illustrated diagrammatically in FIG. 3, where there are shown two cylindrical members 80, 81 (e.g. the members 30, 34 of FIG. 1) of which the time lag is to be measured. These members 80, 81 have marks 82, 83 forming a vernier system, i.e. there is one more of the marks 82 than of the marks 83. For photo-electric detection, the marks would be optically sensed, e.g. alternate matt and reflecting surfaces. They may however be elements suitable for sensing capacitively or magnetically. Two sensors 84, 85 outside a container wall 86 sense the passage of the marks and provide electrical signals which are fed to a coincidence detector 87. The output of the coincidence detector is then fed to a timer circuit 88 with an indicator 89 to measure the time lag with respect to the output signal from a sensor 90 sensing a reference mark 91 in the cylinder 80.

FIG. 4 illustrates a viscometer installed in a pipe line 100. A cylindrical member 101 is axially located in a vertical portion of the pipe line and is supported by drive shafts 102, 103 which are driven in together by a motor 104 through gearing 105, 106. The drive shafts 102, 103 extend through shaft seals 107, 108. Means 109, 110 are provided for feeding a purging liquid into the seals to prevent the ingress of fluid from the pipe line 100 into these seals. This purging liquid, which must be compatible with the fluid under test, is fed into the seals at a rate just sufficient to prevent ingress of the fluid under test into the seals. The torsional deflection is measured, as a time lag, using electro-magnetic pick-ups 111, 112 sensing the passage of ferro-magnetic elements 113, 114 in the member 101 and shaft 102 respectively.

Since the speed of rotation, as long as it is constant over the time interval measured, does not affect the accuracy of the measurement, it is possible to use the fluid flow in a pipe line or other fluid system to effect rotation of a drive member located in a fluid container. In this case, there is no need for any shaft seals for shafts passing to the outside of the container.

FIG. 5 is a plan view of the rotor assembly of a modification of the construction of FIG. 1. The fluid enters a container 120 through an inlet 121 tangentially to the surface of an upper drive member 122 which has impeller blades or paddles 123 at its upper end. The fluid leaves at an outlet 124 tangentially to the surface of a lower drive member which may also have impeller blades or paddles. These drive members otherwise are similar to the members 30, 35 of FIG. 1 and drive an intermediate member similar to the member 34 through a torsionally resilient coupling. Sensing means similar to that of FIG. 1 enables the viscosity to be measured. It will be seen that such an assembly can be put in a sealed container, e.g. a pressure vessel. If the fluid is very viscous, the rotating assembly will be self-centering and no bearings are required.

If there is no fluid flow, the rotating assembly may be rotated by other means, e.g. it may incorporate, in a drive member, a permanent magnet which is rotated by a rotating magnetic field produced by rotating an electromagnet outside the container.

For very viscous fluids, it is not necessary to have a fixed surface adjacent the rotating member and, for example, in FIG. 2, the cylinder 60 may be omitted. The is equivalent to having an infinitely extending body of the fluid. The invention thus includes within its scope means for continuously rotating a drive member, a cylindrical driven member for immersion in a fluid which driven member is resiliently coupled to the drive member by a torsionally resilient tube of substantially smaller diameter than said driven member, a rigid rod extending axially from the driven member through the tube and drive member, and means responsive to the lag of the rod with respect to the drive member.

I claim:

1. A viscometer comprising a fluid container, a drive member rotatable within said container, power means for driving said drive member, a driven member in said container, said driven member having a surface uniformly spaced from an internal surface of said container, means resiliently coupling said drive member to said driven member, and means responsive to the lag of the driven member with respect to the drive member.

2. A viscometer as claimed in claim 1 wherein said means responsive to the lag of the driven member with respect to the drive member comprises timing means to determine the time lag between the passage of datum points in the drive member and driven member past fixed reference points.

3. A viscometer as claimed in claim 1 wherein the drive member is continuously rotated.

4. A viscometer as in claim 2 wherein the drive member is oscillated, the oscillation being such that a constant lag is achieved over that part of the oscillation in which the lag responsive means is operative.

5. A viscometer as claimed in claim 1 wherein said container has a cylindrical internal surface and wherein said driven member has a cylindrical external surface.

6. A viscometer as claimed in claim 5 wherein the drive member has a portion lying closely adjacent one end of said driven member.

7. A viscometer as claimed in claim 6 wherein the drive member has a further portion lying closely adjacent the other end of said driven member.

8. A viscometer as claimed in claim 5 wherein said drive member is coupled at each end to said drive member by elongated torsionally resilient coupling means.

9. A viscometer as claimed in claim 8 wherein said coupling means comprise torsionally resilient rods.

10. A viscometer as claimed in claim 5 wherein said driven member is coupled to said drive member by a torsionally resilient tube concentric with the axis of rotation and wherein a rigid rod is arranged extending from the driven member through the tube and drive member to the aforesaid means responsive to the lag, which means are located outside the container.

11. A viscometer as claimed in claim 1 wherein said means responsive to the lag include sensing means outside the container for sensing the passage of a datum point on the driven member past a fixed reference point.

12. A viscometer as claimed in claim 11 wherein the driven member has a number of marks or marker elements and the drive member has a different number of marks or marker elements, and the sensing means comprises vernier sensing means for detecting the coincidence of passage of one of the number of marks or marker elements on the driven member and one of the different number of marks or marker elements on the drive member past reference points.

13. A viscometer as claimed in claim 11 wherein the means responsive to the lag comprises means for determining the time lag between a first electrical signal from said sensing means and a second electrical signal from another sensing means sensing the passage of a datum point on the drive member past a fixed reference point.

14. A viscometer as claimed in claim 1 wherein said container has an inlet and an outlet for the continuous flow of a fluid.

15. A viscometer as claimed in claim 14 wherein the drive member is shaped to be rotated by the flow of fluid through said container.

16. A viscometer as claimed in claim 15 wherein an inlet and outlet for fluid flow through the container are arranged to give flow tangential said drive member.

17. A viscometer as claimed in claim 15 wherein the drive member has blades or paddles.

18. A viscometer as claimed in claim 1 wherein said drive member includes a permanent magnet and wherein means are provided outside the container to produce a rotating magnetic field acting on the magnet to rotate said drive member.

19. A viscometer as claimed in claim 1 and having a second driven member driven from said drive member through a further resilient coupling, the second driven member having a surface uniformly spaced from a surface of the container so that the fluid is in shear between these surfaces, the spacing between these surfaces being different from the spacing between the surface of the first driven member and container.

20. A viscometer comprising a drive member, means for continuously rotating said drive member, a cylindrical driven member for immersion in a fluid, a torsionally resilient tube forming resilient coupling means coupling said drive member to said driven member to rotate the latter about its axis, said torsionally resilient tube being of substantially smaller diameter than said driven member, a rigid rod secured to the driven member and extending axially through said tube and drive member, and means responsive to the lag of said rod with respect to said drive member due to viscous drag of said fluid on said driven member.

21. A viscometer comprising a fluid container with a cylindrical inner surface, a first rotary element in said container having a cylindrical outer surface uniformly spaced from but close to said cylindrical inner surface, second and third rotary elements axially aligned with said first element, said second and third elements being located respectively adjacent the two ends of said first element, said first element and said second element having closely adjacent end surfaces uniformly spaced from one another, said first and third elements having closely adjacent end surfaces uniformly spaced from one another, drive means arranged for continuously rotating said second and third element in synchronism, resilient coupling means resiliently and drivingly coupling said first element to at least one of said second and third elements, a first datum marker on said first element, a second datum marker on said second element, first and second transducers outside said container for sensing and producing electrical signals in response to the passage respectively of said first and second datum markers past the transducers as the elements rotate, and means responsive to the time difference between said signals.

22. A viscometer for measuring the viscosity of a fluid comprising a fluid container having an internal surface, a drive member rotatably extended into said container, power means for driving said drive member, a driven member in said container that has a surface uniformly spaced from the container internal surface to have the fluid in shear between said surfaces when the driven member is being driven, resilient means extending within said container and connected to the driven member within the container for connecting the drive member to the driven member to move together with the driven member lagging the drive member when the fluid is between said surfaces, and means outside of the container for sensing the lag between the driven member and the drive member.

23. A viscometer as claimed in claim 22 wherein the power means comprises means for continuously rotating the drive member, that each of the drive and the driven member has a reference portion within the container, and that the sensing means comprises means for sensing the passage of the reference portions past fixed reference points.

24. A viscometer as claimed in claim 22 wherein the resilient means comprises an elongated rod having one end portion joined to the drive member and a second portion remote from the one end portion connected to the driven member.

References Cited

UNITED STATES PATENTS

| | | | |
|---|---|---|---|
| 2,814,945 | 12/1957 | Michaux et al. | 73—59 |
| 3,122,914 | 3/1964 | Stabe et al. | 73—59 |
| 3,181,348 | 5/1965 | Lewis | 73—59X |
| 3,292,422 | 12/1966 | Banks | 73—59 |
| 3,349,606 | 10/1967 | Merrill et al. | 73—60 |
| 3,435,666 | 4/1969 | Fann | 73—59X |

FOREIGN PATENTS

| | | | |
|---|---|---|---|
| 810,242 | 3/1959 | Great Britain | 73—69 |

LOUIS R. PRINCE, Primary Examiner

J. W. ROSKOS, Assistant Examiner